(12) United States Patent
Dworzak

(10) Patent No.: US 7,383,184 B2
(45) Date of Patent: Jun. 3, 2008

(54) METHOD FOR DETERMINING A CHARACTERISTIC DATA RECORD FOR A DATA SIGNAL

(75) Inventor: Christoph Dworzak, Biel (CH)

(73) Assignee: Creaholic SA, Biel (CH)

( * ) Notice: Subject to any disclaimer, the term of this patent is extended or adjusted under 35 U.S.C. 154(b) by 869 days.

(21) Appl. No.: 10/257,612

(22) PCT Filed: Apr. 17, 2001

(86) PCT No.: PCT/CH01/00240

§ 371 (c)(1),
(2), (4) Date: Nov. 25, 2002

(87) PCT Pub. No.: WO01/80235

PCT Pub. Date: Oct. 25, 2001

(65) Prior Publication Data

US 2003/0125936 A1 Jul. 3, 2003

(30) Foreign Application Priority Data

Apr. 14, 2000 (CH) ........................ 744/00

(51) Int. Cl.
*G10L 17/00* (2006.01)
(52) U.S. Cl. ........................ 704/243; 704/246
(58) Field of Classification Search .............. None
See application file for complete search history.

(56) References Cited

U.S. PATENT DOCUMENTS

| 3,919,479 | A | * | 11/1975 | Moon et al. ................ 704/237 |
| 4,076,958 | A | * | 2/1978 | Fulghum .................... 704/268 |
| 4,343,969 | A | * | 8/1982 | Kellett ....................... 704/254 |
| 4,379,948 | A | | 4/1983 | Ney et al. |
| 4,882,755 | A | * | 11/1989 | Yamada et al. ............. 704/239 |
| 4,991,216 | A | * | 2/1991 | Fujii et al. .................. 704/254 |
| 5,422,977 | A | * | 6/1995 | Patterson et al. ........... 704/276 |
| 5,425,127 | A | * | 6/1995 | Yato et al. .................. 704/234 |
| 5,761,639 | A | * | 6/1998 | Takebayashi et al. ....... 704/253 |
| 6,122,615 | A | * | 9/2000 | Yamamoto .................. 704/252 |
| 6,292,775 | B1 | * | 9/2001 | Holmes ....................... 704/209 |

(Continued)

FOREIGN PATENT DOCUMENTS

EP 0 485 315 A2 5/1992

(Continued)

OTHER PUBLICATIONS

Patent Abstracts of Japan, Sound Encoding Device, Publication No. 08137498, Publication Date: May 31, 1996.

(Continued)

*Primary Examiner*—David D. Knepper
(74) *Attorney, Agent, or Firm*—Rankin, Hill & Clark LLP

(57) ABSTRACT

A method for determining a characteristic data set ("fingerprint") for a sound signal, the sound signal itself is searched through for characteristic locations, and these characteristics locations are used for producing a characteristic data set. For this the frequency spectrum is evaluated over a time interval, subdivided into frequency bands, and averaged over each frequency band into a value. The fingerprint then consists of data that has been obtained from these values after possible further averagings, wherein only data is included which belongs to certain time segments.

18 Claims, 5 Drawing Sheets

U.S. PATENT DOCUMENTS 6,990,447 B2 * 1/2006 Attias et al. ................ 704/240

FOREIGN PATENT DOCUMENTS

| EP | 0 612 160 A2 | 8/1994 |
|---|---|---|
| EP | 0 966 919 A1 | 12/1999 |

OTHER PUBLICATIONS

Patent Abstracts of Japan, Data Processing Device, Data Processing Method, Program Providing Medium, and Recording Medium, Publication No. 2000221988, Publication Date: Aug. 11, 2000.

* cited by examiner

METHOD FOR DETERMINING A CHARACTERISTIC DATA RECORD FOR A DATA SIGNAL

BACKGROUND OF THE INVENTION

1. Field of the Invention

The present invention relates to a method, to a computer program, to a recording medium and to a device for determining a characteristic data set for a data signal.

2. Description of Related Art

One of the consequences of the rapid development of the world wide web is the on-line obtainability and sales of music recordings that are duplicated as pirate copies, which opens the door to copyright infringement on a large scale. The detection of such infringements until now has not been effected systematically and was more or less left to chance. A reason for this is the fact that the identification of music recordings by bugging is time consuming and therefore the companies and persons hit by copyright infringements had to make considerable means available. On the other hand, music identification based on computer software has until now been limited to indicators such as the length of the recording or characteristic combinations on a recording. Such an identification is suitable for the comparison of original CD recordings, but however fails if a recording has been clipped, compressed or changed in another manner. For example, it thus particularly does not function with the identification of digital downloads, analog recordings, etc.

Analogous problems are also encountered with further electronic data for which one may raise the question of a copyright infringement. Thus, for example, film recordings are becoming increasingly digitally available, for example recorded on a DVD or may be downloaded online in a suitable format.

These questions arising in the field of copyright are part of a large problem. The handling of large data quantities is generally a constantly growing challenge. Ever increasing quantities of data are electronically recorded and made available. Compression algorithms indeed help reduce these data quantities for transmission and storage. However, the much greater basic underlying problem of handling the data, that of finding one's way in the quantities of information, is not solved by compression algorithms. One group of examples of such large data quantities amongst others are to be found in technology, for example with the electronic monitoring of the condition of a system, for example of a motor, an installation, a vehicle, etc. Here it would be desirable if in a short time one could obtain important information on the condition of the monitored system from a large quantity of arising information. This analogously applies, for example, to science and its direct application. Whole branches of research are essentially occupied with evaluating recorded data during a short time, particularly in astronomy, in particle physics, when determining the structure of biological matter. The same is also true of medicine (computer tomography, nuclear spin tomography, electronically recorded X-ray pictures, ultrasound data recording etc.).

SUMMARY OF THE INVENTION

The present invention is directed toward reducing or minimizing the problems associated with analysing large quantities of data. The present invention creates the possibility of being able to allocate to a data signal which is present in the function of a parameter, a characteristic data set which is characteristic of the data signal when it is not exactly recorded (for example dubbed in an analog manner), has been electronically changed, and/or clipped. This data set is to permit an efficient and automated comparison of the data signal to a reference. The comparison should yield conclusive information as to whether the data signal is essentially identical to the reference.

In accordance with the invention, a method is provided for determining a characteristic data set for a data signal as well as a computer program, a recording medium and a device for carrying out this method. The method is to be effected in an automated manner and the data set is to be as small and as manageable as possible and is to be characteristic of the data signal even if the data signal has not been exactly recorded, has been electronically changed and/or clipped.

With the method according to the invention for determining a characteristic data set for a data signal, the data signal itself as a function of the parameter is searched through for characteristic locations, and these characteristic locations are used for the production of a characteristic data set.

A first example of such a data signal is a sound recording that is present as a parameter as a function of time. The characteristic locations may then, for example, be selected as characteristic with respect to their frequency distribution, their rhythm, their volume and/or the temporal change of these variables.

In this embodiment of the method according to the invention the sound recordings themselves are processed into a characteristic data set. This is in contrast to the state of the art where a data set characterising a sound recording, on the sound carrier, is added to the sound recording. By way of this the characterising data set is characteristic of the sound recording, thus is, for example, the piece of music itself and is not dependent on possible electronically manipulatable data such as the length of the recordings, their placing on a recording medium (CD, DVD, . . . ), etc. The method according to the invention at the same time has an amazing parallel to the manner in which a person identifies a music recording. An analogous consideration may also be made, for example, with film recordings or results of measurements, etc.

By way of the method according to the invention and the device according to the invention, a data set of at the most a few kilobytes is allocated to a data signal which digitalised comprises a data quantity of several megabytes. It is now ascertained that this data set determined according to the invention is characteristic of the music recording and capable of differentiating it. On account of the obvious analogy, the data set in the subsequent description is thus also called a "fingerprint".

The method according to the invention may run its course in a fully automated manner and at no point in time is an approximation or a decision of a person required. By way of this and on account of the scope of the data quantity, which is very small in comparison to the actual data signal and which preferably comprises a fingerprint, the method is very suitable for managing large data banks. This applies also to the use in the world wide web that has developed into something like a single worldwide data bank.

By way of programs that automatically sift through the world wide web (web crawlers, "spiders", etc.), the method according to the invention may be used to search through this for sound and video recordings. For this, only a data bank of fingerprints created according to the invention and belonging to a music or film publisher needs to be present, which is compared to the continuously detected fingerprints of sound or film recordings offered in the web. These may then, for example, with other means be examined whether they are pirate copies. The method according to the invention, the computer program, the recording medium and the device may however also serve other purposes. Thus, for example, an unknown sound recording may be identified and delivered by a music publisher. Radio stations too are often confronted with the requirement of ascertaining the identity of a recording that has been sent in by a listener and see a potential in the invention for economizing their activity. A further application of the invention could be a billing system for pieces of music or film recordings marketed via the internet. Finally the invention may also serve for searching large music or film data banks for duplicates or, before a new entry, to examine such a data bank whether the corresponding recording is already present.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
FIG. 1 shows an input signal.

An input signal that may, for example, be transformed into music, a human voice, or another sound signal is brought into a processable standard form in a first step. For this purpose the input signal is digitalised or decompressed, converted from a stereo into a mono-signal when required and subsequently led to the device via an interface. The device input data accordingly is present as a simple signal $A(t)$ as a function of time t as shown in FIG. 1 of the drawings.

The method is now based on scanning through the sound signal, determining its frequency spectrum in a multitude of intervals, and reducing the data quantity by a data processing apparatus (i.e., a computer) to a few data points. Subsequently, a certain time period is selected. The data points representing the frequency spectrum over this time period serve as a "fingerprint" of the sound signal. In the following one possibility for determining the fingerprint is yet described by way of one example with advantageous numbers and time interval lengths.

Figure 2:
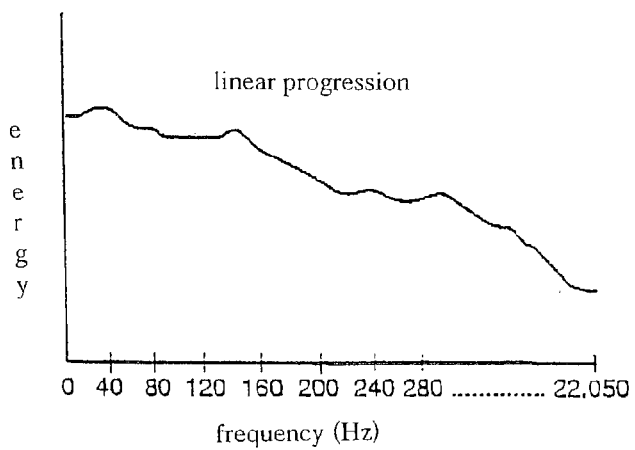
FIG. 2 the Fourier transformed signal of a time interval.
Figure 3:
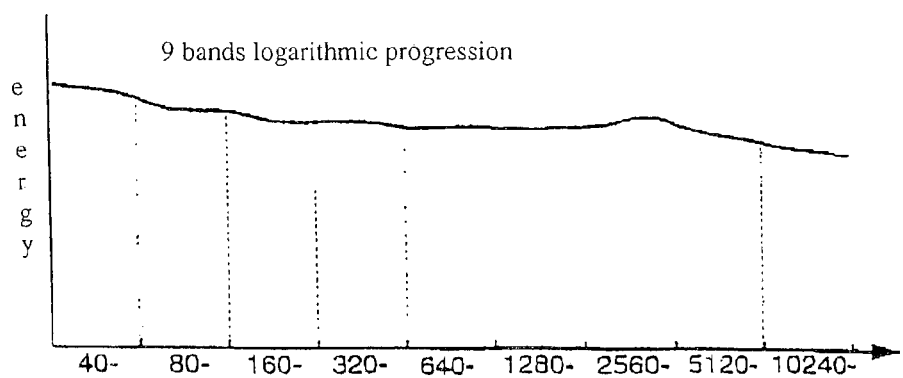
FIG. 3 the logarithmically scaled signal of FIG. 2 subdivided into 9 bands, FIG. 4 a representation of the signals of 8 bands in each case averaged over the whole band, as a function of time FIG. 5 a representation of a sequence of data in each case averaged over a time segment of 0.4 s, consisting in each case of 9 data points, FIG. 6 a representation as FIG. 5, wherein the data of the four time segments determining the fingerprint are represented in a bold manner, FIG. 7 an overview of a method for determining a characteristic time period, FIG. 8 a characteristic data set determined according to the invention, as a quantity of discrete values, as a function of time and frequency, FIG. 9 the values of FIG. 8, together with an average surface, and FIG. 10 the average surface of FIG. 9 together with the representation of angles setting its position.

The frequency spectrum $A_i(f)$ (FIG. 2) of the signal in the interval i is obtained from the signal $A_i(t)$ in this interval by way of a Fourier transformation. In the cited example the signal recorded over an interval length of 25 ms is numerically Fourier transformed. The Fourier transformation is effected by a known numerical method, for example by the FFT (Fast Fourier Transform) algorithm. The frequency spectrum $A_i(f)$ that is thus obtained is subsequently logarithmically scaled. This generally, and at the same time, has a smoothing effect on the spectrum. The spectrum is subsequently subdivided into 9 bands that, on the logarithmic frequency scale, for example, have a uniform width, as this is also shown in FIG. 3. In each band there is now effected a weighted averaging of the $A_i(f)$ signal over the bandwidth to a value $A_{i,n}$, wherein n=1, 2, . . . , $n_0$=9. The average values $A_{i,n}$ serve as characteristic values for the frequency spectrum in the band n in the interval i. Fourier transformation, scaling, and averaging are effected simultaneously to the scanning through of the sound signal. In this manner the quantity of the data to be stored and processed in the data processing apparatus is kept small at all times.

Figure 4:
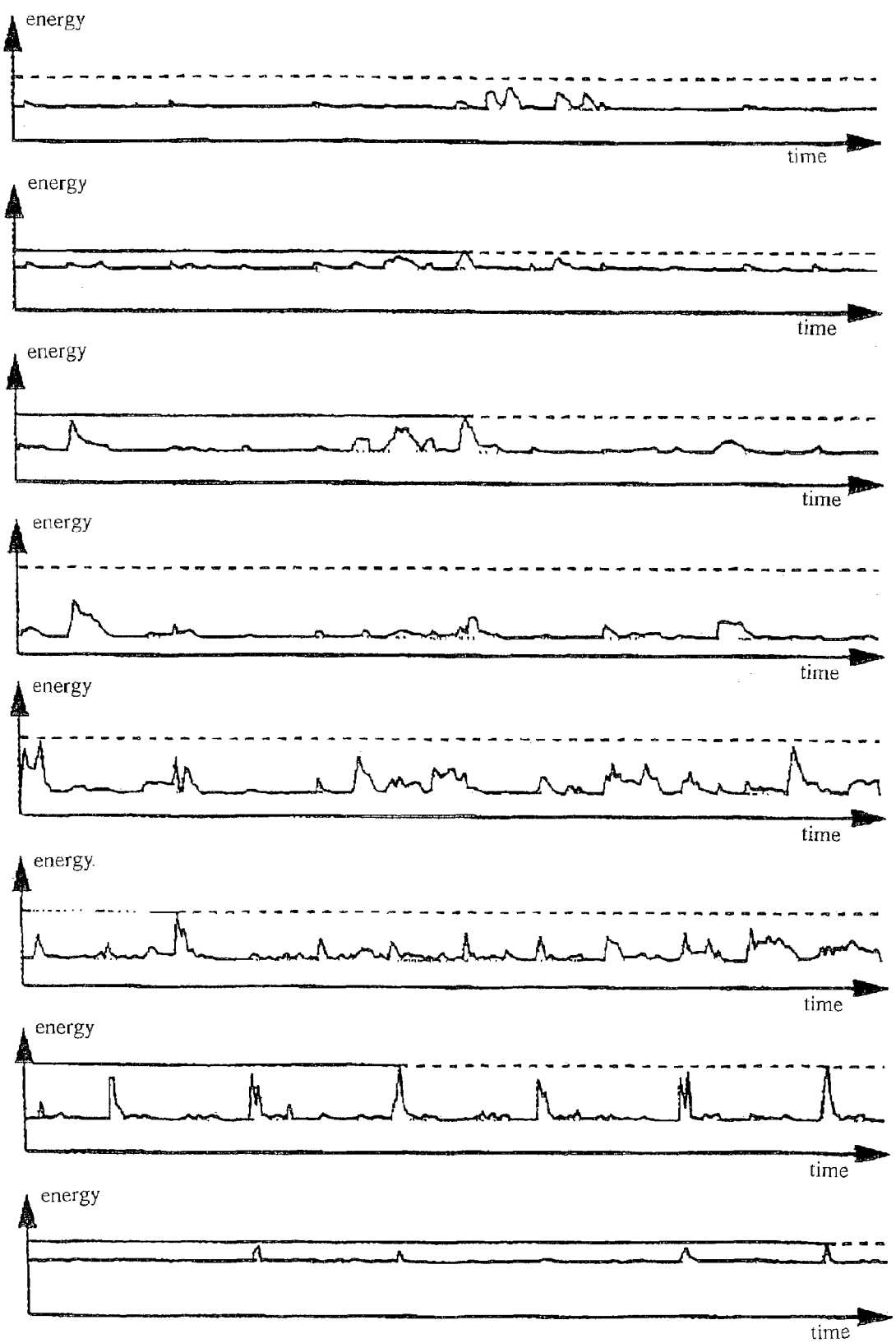

A representation of the values $A_{i,n}$ as a function of the interval indexes representing time for each band n=1, 2, . . . , $n_0$=8 as results of an actual measurement are shown in FIG. 4. For each of the curves the minimum of the value also represents the zero line.

Figure 5:
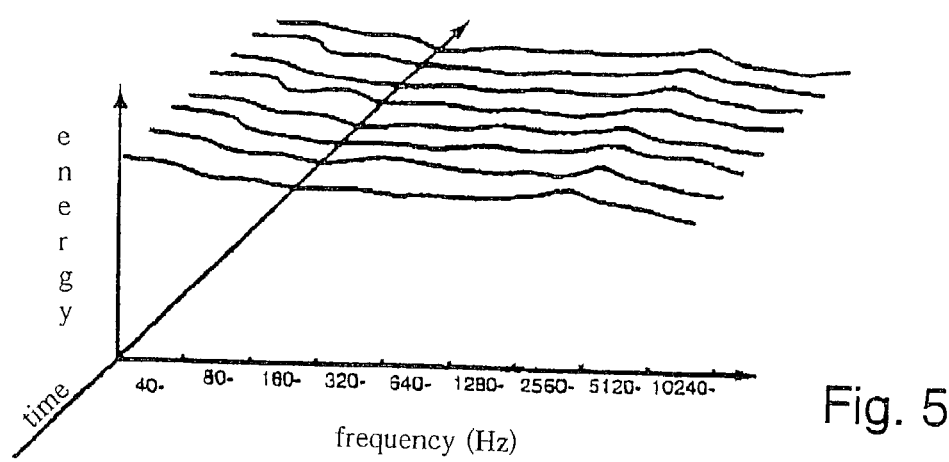

In a next step a further averaging over time is effected. For this, for each band n the values $A_{i,n}$ of the respective 16 intervals i of a time segment z of 0.4 s duration are averaged into a value $A_{i,n}$. This averaging may also be effected simultaneously to the scanning through of the sound signal. FIG. 5 represents a sequence of eight data of a time segment consisting in each case of $n_0$=9 data points.

Figure 6:
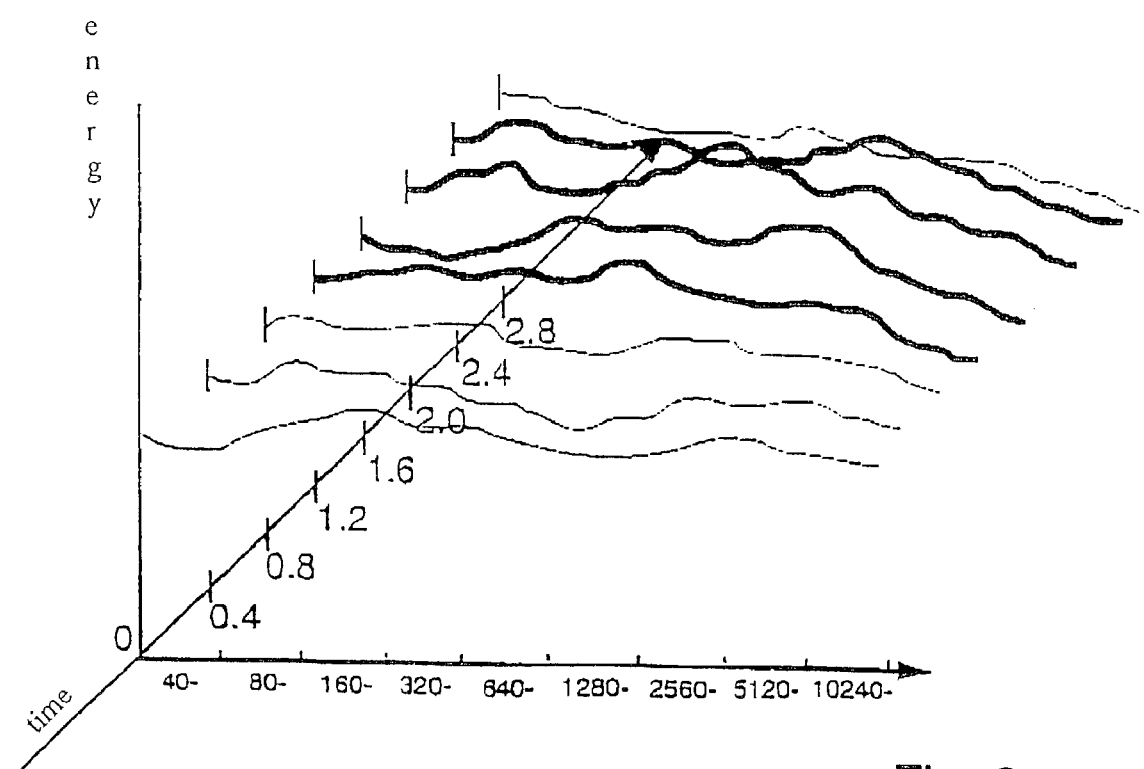

After the sound signal has been scanned through and the above described process has been completely finished, the fingerprint is evaluated from the end data $A_{z,n}$. For this in a first step in each case four neighbouring time segments z are grouped together to a time period of 1.6 s length. A certain value is evaluated for each time period, for example the sum of 4×9=36 values $A_{z,n}$, the sum of the differences of the first and of the last $A_{z,n}$-value for each band n, or the like. The evaluated value serves the identification of a location in the sound recording. The fingerprint consists of the 36 values $A_{z,n}$, z=k, . . . , k+3; n=1, . . . , 9 of that time period for which the evaluated value is extreme thus, for example, the sum is maximal (FIG. 6).

The evaluation of the time period selected for the fingerprint does not need to be effected directly or indirectly from information determined from the values $A_{i,n}$. Alternatively to this, the data signal as a function of time may also be used for determining such a time domain. For example, a vicinity of the volume maximum is selected as a time period. The characteristic data set analogously to the previously described example is composed of the values $A_{z,n}$ in a vicinity of the maximum.

Figure 7:
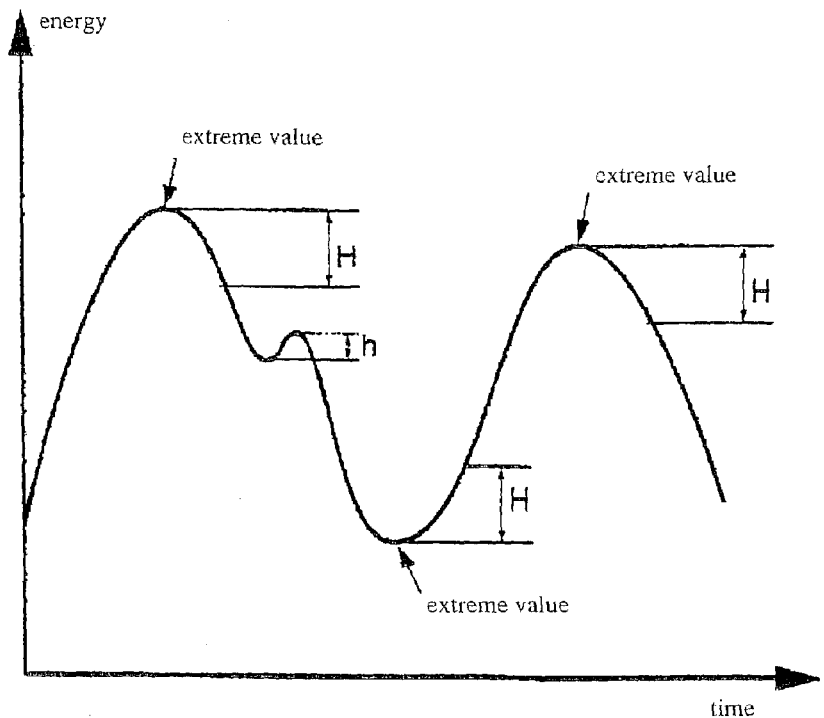

A refinement of the procedure for determining a characteristic location in the data signal will be described by way of FIG. 7. In FIG. 7 the energy as a function of time is shown schematically. This curve may, for example, originate directly from the signal. It may, however, also be obtained according to the previously described averaging method via the $A_{z,n}$-values, which in the example of FIG. 6 serves for determining the time period. According to the figure a local maximum is determined. If, subsequent to reaching the maximum, the value of the energy reduces by a configurable value H, a vicinity of this value is used for determining a fingerprint. Thereafter, one searches for a local minimum. As such, only one after which the energy increases by the value H (or another configurable value) is valid. In the figure a minimum is further drawn in, after which the value only increases by h<H. This value is not used as a minimum. The value at which the minimum is reached, for example, is not used for a fingerprint. On the other hand only after this is a maximum again evaluated at which the next fingerprint is determined. In the figure, the used extremes are indicated with arrows.

By way of this procedure one may synchronise the recognition of data signals. At each point in time one may access into a stream and then take the fingerprints at the locations that have already been used for determining the fingerprint of the reference.

Although the original data signal was only given as a function of a parameter the time, the thus determined fingerprint is a function of two discrete variables z and n. By way of this one may achieve a recognition quota that is far superior to a corresponding method which only records data points as a function of one parameter. This is true in comparison to a method that envisions determining individual volume values as a function of time as well as also for determining a frequency spectrum at a certain point in time. The increased recognition quota is also the case if, for example, a number of volume values are selected that are comparable to the number of data points $A_{z,n}$.

Here it is expressly pointed out that, of course, one may just as easily select interval lengths, bandwidths, etc. which are different from those in the embodiment example. For example, the number of used bands $n_0$ is preferably at least between 4 and 40 and, more preferably, between 6 and 16. The number of time segments is preferably likewise at least 4 and may for example lie between 8 and 64, e.g. at 16. The total number of data points that form the fingerprint is, for example, at least 24. The length of the time interval over which the fingerprint is determined is preferably at least 0.05 s and at the most 60 s.

Figure 8:
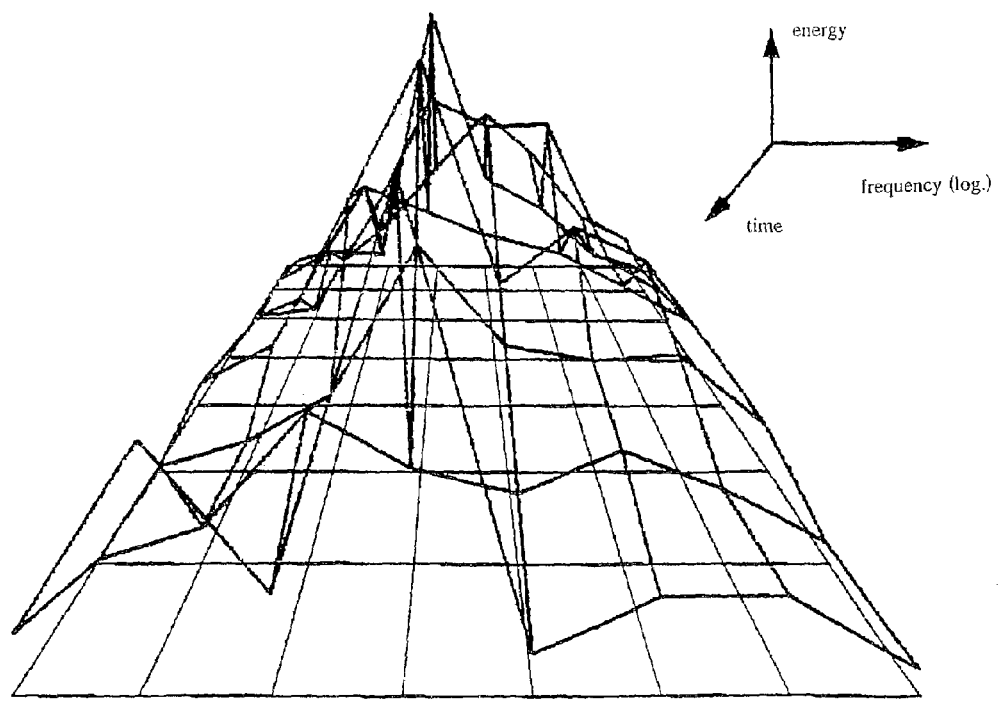

A representation of the characteristic data set of a data signal with a parameter selection different from the previous description is shown in FIG. 8. The figure shows values $A_{z,n}$ as a function of z, according to time and the band n, according to the (logarithmised) frequency. In the example according to FIG. 8 at the same time there are selected 8 frequency bands having, in each, case 8 checkpoints. The 64 data points form the fingerprint and represent a "mountain".

Figure 9:
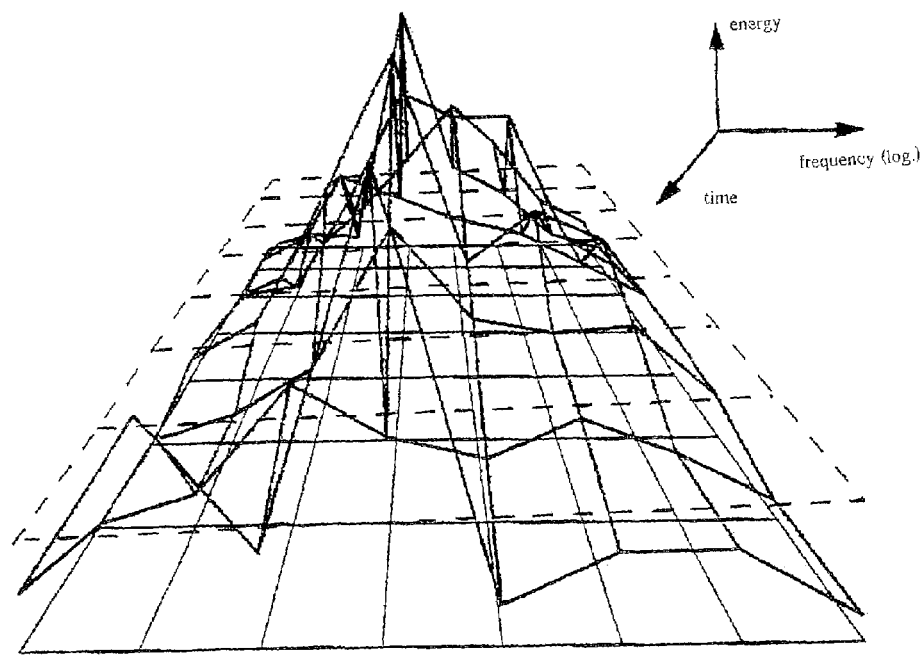
Figure 10:
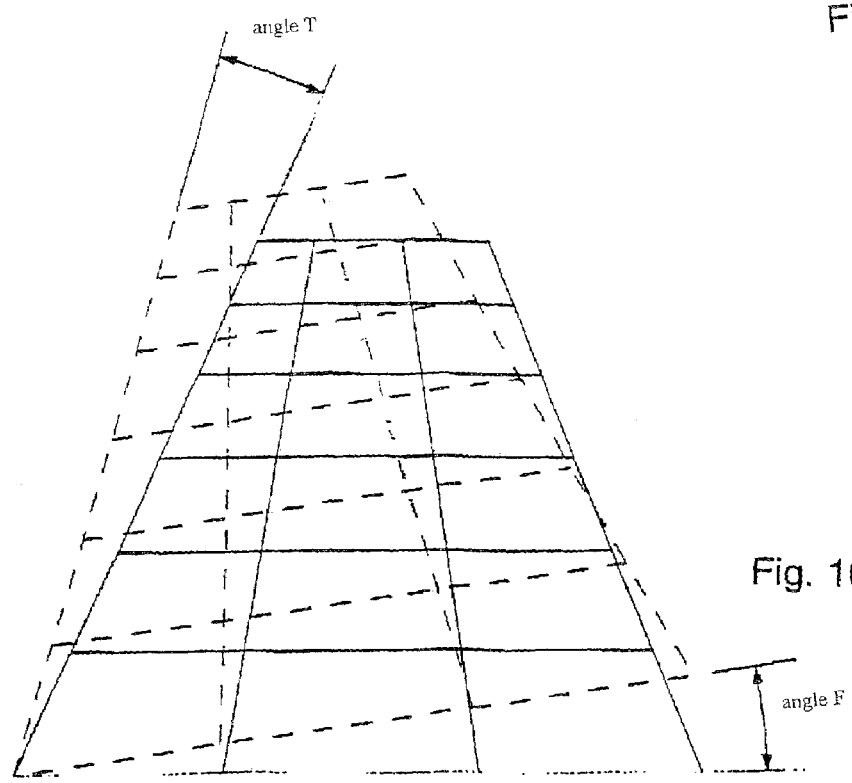

By way of FIG. 9 there is further shown how the characteristic data set of FIG. 8 may be further reduced. An average surface as a middle plane of the points is shown dashed in the figure. It is, for example, determined by the method of least squares. As known a plane may be completely characterised by 3 parameters, for example by the x, y and z axis sections in a Cartesian coordinate system. Alternatively, according to the invention the average position of the plane (height) as well as the angle in the frequency direction and in the time direction may be used as parameters. FIG. 10 serves for clarifying the significance of the angles; they are a measure of the local course of volume and the local frequency distribution.

The three parameters height, angle in the frequency direction and angle in the time direction are no longer used as a fingerprint for the data signal, but serve for indexing thereof. Such an indexing is recommended with large data quantities, where the comparison of a fingerprint to all reference fingerprints of a data bank may lead to problems in performance. Fingerprints may be sorted by way of the indexing. If a comparison of a fingerprint to the values of a data bank is to be effected, the indexing of the data bank signals is compared to the corresponding indexing values of the signal to be compared. One selects those fingerprints of the databank for which the angles only slightly deviate from that of the fingerprint to be compared, for example plus/minus a percentage number such as plus/minus 35%. The height is preferably not used for indexing since it is dependent on the scaling. A further usable index is the "hilliness" of the mountain, i.e. the average square deviation of the points of the mountain from the surface. The thus selected fingerprints are compared to the fingerprint to be compared.

For the sake of simplicity only one of the above values may be used as an index.

A comparison of the fingerprint of two different sound signals is effected now as follows. According to whether the sound signals have been scaled or not, in a first step the fingerprint is normalized. All values $A_{z,n}$ of each of the two fingerprints are multiplied by a constant so that after this multiplication the sums of the 36 values $A'_{z,n}$ and $B'_{c,n}$ of both fingerprints are equal to a predetermined number, for example 1. Thus, sound recordings of different volumes may therefore also be compared. If, on the other hand, it is clear that the two signals have not been scaled, then a normalisation should not take place since it entails a loss of information. The sum of the squared differences $A'_{z,n}$-$B'_{c,n}$ is formed in a pointwise manner from the possibly normalized fingerprints. If these do not exceed a certain threshold value, the sound recordings characterised by the fingerprints are identical. It is yet to be mentioned here that this method yields a fuzzy-match. The obtained information "identical"/ "not identical" depends on the selected threshold value and is not strictly unambiguous, wherein however the recognition quota is extremely high.

The determining of the fingerprint for data signals which are given as a function of a single parameter (for example time) functions analogously to the above method for sound signals. The data signal in a short interval is Fourier transformed with respect to the parameter t and the "spectrum" obtained by way of this is averaged over a finite number of bands to a finite number no of values. The bands, for example on a logarithmic scale, have a uniform width. This method is carried out for a plurality of intervals following one another, by which means one obtains no discrete functions from the interval index i or from the parameter t. Thereupon there are, for example, effected averagings over several intervals (i) to values $A_{z,n}$ provided with a further index z. A characteristic location is then determined as a function of the parameter t or of the index i or z. As such one selects a location where a certain value is extreme. The fingerprint then consists of the values $A_{z,n}$ for n=1, ..., $n_0$ and z in the vicinity of the extreme value. Also with this embodiment, by way of subdividing the parameter domain into a multitude of intervals i and Fourier transformation in these intervals it is achieved that the characteristic data is present as a function of two indices z and n or as a discrete function of the parameter t as well as a corresponding variable in the Fourier domain. The fingerprint is thus given as a quasi-2D function which is gained from a 1D function.

For many signals time lends itself as a suitable parameter. That which has been Fourier transformed as a frequency spectrum then also has an illustrative significance. The method may, however, also be applied to other parameters. With a signal representing a picture one may also determine a corresponding spectrum for a location parameter, for example by Fourier transformation.

With the example "film recording" it will be briefly discussed how this method may be extended to functions with several variables. The video signal of a film recording may, for example, be represented as h(x, y, t), wherein x, y is a co-ordinate system representing the display surface and t the time. Analogously to the above method there is effected a Fourier transformation with respect to time. In principle, this is effected for all values x, y. Preferably however in the x and y direction one carries out a suitable averaging for reducing the data quantity. For averaging functions of the type $h_t(x, y)$ one refers to the extensive know-how of electronic picture processing. The following steps are again effected analogously to the above method.

Concluding, the method for determining a characteristic data set for a data signals lies in analysing the data signal itself, processing it further and retaining a part as a characteristic data set. For this, the sound signal is preferably digitalised in the case that it is present in a non-digital form, and subsequently analysed by way of electronic data processing and processed into a characteristic data set, so that the data quantity of the characteristic data set is a multiple smaller than that of the data signal. This may be effected by carrying out the following steps:

subdividing the data signal into intervals i and time segments z, determining a spectrum in each interval i by transforming the signal into the frequency domain, extraction of values $A_{i,n}$ characteristic of the spectrum, for each interval, determining values $A_{i,n}$ characteristic of the spectrum from the values $A_{i,n}$, for each time segment, setting a set of time segments whose values $A_{i,z}$ form the characteristic data set.

The determination of the spectrum by transforming the signal into the frequency domain in the above-described examples is effected by a numeric Fourier transformation. However, also alternative methods may be applied for transforming a signal into the frequency domain, for example a Hartley transformation, a series of (digital) electronic filters, etc.

The extraction of the characteristic values $A_{i,n}$ is, for example, a weighted averaging over a frequency band. Each time segment may consist of one or of several intervals so that the determination of the values $A_{z,n}$ is effected by averaging the values $A_{i,n}$ over the intervals of the time segment.

Preferably, in each case one group of time segments neighbouring one another are grouped together for setting the set of time segments. Subsequently, a certain value is evaluated for each time period, for example the sum of the 36 values $A_{z,n}$ or the sum of the differences of the first and of the last $A_{z,n}$-value for each band n. That group of time segments for which the evaluated value is extreme, thus, for example, the sum is maximal, forms the set of time segments.

A data processing program for determining a characteristic data sets for a sound signal is, for example, a program which enables a computer to carry out the above described method step by step. A recording medium for this program is for example a computer hard disk pre-recorded with this program, a CD or a DVD, an electro-optical computer disk, an external magnetic memory, a computer floppy disk or another storage medium. A device for determining a characteristic data set for a sound signal for example is a computer equipped with a data processing program.

Concluding, it is further pointed out that the above described method in no way represents the only conceivable embodiment or form of the invention, but may yet be modified in some aspects. Thus, as already mentioned completely different interval and time segment lengths are conceivable than those that have been previously described. In particular, it is also possible for each time segment to correspond exactly to one time interval, thus that for the values $A_{i,n}$ not to be averaged further. Assessments other than the previously described effected setting of the values $A_{z,n}$ any evaluation of an extreme value are also conceivable for determining the set of time intervals. An unambiguous identification of a location in the data signal is the only thing that matters here.

Considerations that are significantly different from methods previously described as examples are also conceivable. For example, important method steps such as transforming the signal into the frequency domain or averaging may also be carried out in an analog-electronic manner. For example, the evaluation of extremes may be carried out very well in the known analog-electronic manner. A device for carrying out the method according to the invention with electronic means has, for example, means for electronic Fourier transformation for electronic integration, and switch means that are actuated on reaching the maximum or threshold values of the signal. Furthermore, for example, an A/D converter is present that allocates a digital value to the function values that have been evaluated on actuating the switch means. Storage means, for example a computer connected via an interface, and EEPROM memory or the like may serve for storing the characteristic data set. A comparison to a reference that, for example, has likewise been stored, may be effected in an analog-electronic manner. The Fourier transformation/logarithmisation in such a device may be replaced by a series of bandpass filters. In this embodiment the bandpass filters ensure a transformation of the signal into the frequency domain.

Another variation of the above embodiment examples may be achieved if the period that is selected as the characteristic location in the data signal is not coherent. For example, one may envisage this period to comprise several time spans which, in each case, are distanced from one another by half a minute, one minute, . . . . In this manner, among other things, one may unambiguously differentiate an individual clip from a piece of music or a film, for example a trailer, from the whole piece of music.

The invention claimed is:

1. A method for determining a "fingerprint" in the form of a data set which is characteristic of a particular data signal which is present as a function of time, wherein the data signal itself is searched through for characteristic locations and such characteristic locations are used for producing said "fingerprint", said method comprising the steps of:

specifying time intervals i;

transforming the data signal in the time intervals i into the frequency domain in order to obtain a plurality of frequency spectra;

for each time interval i, averaging the relevant frequency spectrum over each of a plurality of frequency bands n in order to produce a series of discrete values $A_{i,n}$;

selecting a time period, comprising several time intervals i, as a characteristic location based on information gained from the data signal and/or from the discrete values $A_{i,n}$; and, deriving the characteristic data set from the discrete values $A_{i,n}$ of the time intervals i lying within the selected time period;

whereby, in use, said characteristic data set serves as the "fingerprint" capable of differentiating the particular data signal from other data signals.

2. The method according to claim 1, wherein the time period is selected as the characteristic location based on frequency distribution, rhythm, magnitude of the amplitude of the data signal and/or temporal change of these variables.

3. The method according to claim 1, wherein the data signal is digitised in the case that it is present in a non-digital form, and wherein said digitised data signal is analysed by way of electronic data processing and is processed into the characteristic data set, wherein the data quantity of the characteristic data set is a multiple smaller than that of the data signal.

4. The method according to claim 3, further comprising the following steps:
subdividing the data signal into time segments z;
for each time segment z, determining values $A_{z,n}$ characteristic of the frequency spectrum in the time segment z from the values $A_{i,n}$;
forming the characteristic data set from the values $A_{z,n}$ of the set of time segments forming the time period.

5. The method according to claim 4, wherein the width of the frequency bands preferably in a logarithmic scale is identical, and the averaging of the characteristic values $A_{i,n}$ is a weighted averaging over each frequency band n.

6. The method according to claim 4, wherein each time segment z consists of at least one time interval i.

7. The method according to claim 6, wherein the determination of the values $A_{z,n}$ is effected by averaging the values $A_{i,n}$ of the intervals i in a time segment z.

8. The method according to claim 4, wherein, selecting the characteristic location consisting of a set of time segments z,
groups of neighboring time segments are assembled together;
the sum or a sum of differences is formed for the values $A_{z,n}$ of the time segments of each group, and
the group of time segments at which the thus evaluated value is extreme is selected as the characteristic location.

9. The method according to claim 4, wherein, for selecting the characteristic location consisting of a set of time segments;
a particular information variable is extracted from the data signal as a function of time;
a first local maximum amplitude of the information variable is determined;
it is determined whether the information variable reduces by a first configurable value (H), subsequent to reaching the first local maximum in which case at least one time segment in the vicinity of the first local maximum is selected as belonging to the set of time segments;
subsequently a local minimum amplitude of the information variable is sought, following which the information variable increases by a second configurable value (H); and
a second local maximum amplitude of the information variable following the local minimum is sought and at least one time segment in the vicinity of the second local maximum is selected as belonging to the set of time segments.

10. The method according to claim 1, wherein the transformation of the signal into the frequency domain is carried out with at least one of a numeric Fourier transformation and a Hartley transformation.

11. The method according to claim 1, wherein at least one of the method steps is carried out in an analog-electronic manner.

12. The method of claim 1, wherein the step of selecting a time period comprising several time intervals i, as a characteristic location, comprises the sub-steps of:

determining a plurality of different time periods, each time period comprising a plurality of time intervals; and
selecting, based on information gained from the data signal and/or from the discrete values $A_{i,n}$; one of said plurality of time periods as the characteristic location.

13. A method for determining a "finger" in the form of a data set which is characteristic of a particular a data signal, which is present as a function of a parameter t, wherein the data signal itself is searched through for characteristic locations and such characteristic locations are used for producing said "fingerprint", said method comprising the steps of:
specifying parameter intervals i;
transforming the data signal with respect to the parameter t in the intervals i, into a corresponding frequency domain in order to obtain a plurality of frequency spectra;
for each interval i, averaging the relevant frequency spectrum over each of a plurality of frequency bands n in order to produce a series of discrete values $A_{i,n}$;
selecting a parameter range as a characteristic location by way of information obtained from the data signal or the values $A_{i,n}$, wherein the parameter range comprises several intervals i; and,
deriving the characteristic data from the discrete values $A_{i,n}$ of the intervals lying in the selected parameter range
whereby, in use, said characteristic data set serves as the "fingerprint" capable of differentiating the particular data signal from other data signals.

14. A method for recognition of a data signal which is present as a function of time, wherein the data signal is searched through for characteristic locations and these characteristic locations are used for the production of a characteristic data set which is compared to reference data sets from a data bank, the method comprising the steps of:
specifying time intervals i;
transforming the data signal in the time intervals i into the frequency domain in order to obtain a plurality of frequency spectra;
for each time interval i, averaging the relevant frequency spectrum over each of a plurality of frequency bands n in order to produce a series of discrete values $A_{i,n}$;
selecting a time period, comprising several time intervals i, as a characteristic location based on information gained from the data signal and/or from the discrete values $A_{i,n}$;
deriving the characteristic data set from the discrete values $A_{i,n}$ of the time intervals i lying within the selected time period;
determining a deviation variable of the characteristic data set from the reference data sets;
selecting that reference data set with which the deviation size is minimal.

15. The method according to claim 14, wherein the characteristic data set is compared to all reference data sets present in the data bank.

16. The method according to claim 14, wherein, index data is determined from the characteristic data set and, one determines index data is similarly allocated to the reference data sets and only those reference data sets, whose index data deviates by less than a relative or absolute threshold value from the index data of the characteristic data set, are used for the comparison.

17. A method for utilizing a storage medium with a computer program stored thereon, which comprises means to permit a computer to carry out a method for determining a "fingerprint" in the form of a data set which is characteristic of a particular data signal which is present as a function of a parameter t, wherein the data signal itself is searched through for characteristic locations and such characteristic locations are used for producing said "fingerprint", said method comprising the steps of:

specifying parameter intervals i;

transforming the data signal with respect to the parameter t in the intervals i, into a corresponding frequency domain in order to obtain a plurality of frequency spectra;

for each interval i, averaging the relevant frequency spectrum over each of a plurality of frequency bands n in order to produce a series of discrete values $A_{i,n}$;

selecting a parameter range as a characteristic location by way of information obtained from the data signal or the values $A_{i,n}$, wherein the parameter range comprises several intervals i; and, deriving the characteristic data from the discrete values $A_{i,n}$ of the intervals lying within the selected parameter range whereby, in use, said characteristic data set serves as the "fingerprint" capable of differentiating the particular data signal from other data signals.

18. A method for operating a computer program with means to permit a computer to carry out a method for determining a "fingerprint" in the form of a data set which is characteristic of a particular data signal which is present as a function of a parameter t, wherein the data signal itself is searched through for characteristic locations and such characteristic locations are used for producing said "fingerprint", said method comprising the steps of:

specifying parameter intervals i;

transforming the data signal with respect to the parameter t in the intervals i, into a corresponding frequency domain in order to obtain a plurality of frequency spectra, for each interval i, averaging the relevant frequency spectrum over each of a plurality of frequency bands n in order to produce a series of discrete values $A_{i,n}$;

selecting a parameter range as a characteristic location by way of information obtained from the data signal or the values $A_{i,n}$, wherein the parameter range comprises several intervals i; and, deriving the characteristic data set from the discrete values $A_{i,n}$ of the intervals lying within the selected parameter range whereby, in use, said characteristic data set serves as the "fingerprint" capable of differentiating the particular data signal from other data signals.

* * * * *

UNITED STATES PATENT AND TRADEMARK OFFICE
CERTIFICATE OF CORRECTION

| | |
|---|---|
| PATENT NO. | : 7,383,184 B2 |
| APPLICATION NO. | : 10/257612 |
| DATED | : June 3, 2008 |
| INVENTOR(S) | : Dworzak |

It is certified that error appears in the above-identified patent and that said Letters Patent is hereby corrected as shown below:

Column 10, Line 59 (Claim 16, Line 2), delete "one determines".

Signed and Sealed this

Thirtieth Day of September, 2008

JON W. DUDAS
*Director of the United States Patent and Trademark Office*